Dec. 2, 1958 R. MÜLLER 2,862,405
STROKE VARYING DEVICE FOR MECHANICAL
PRESSES AND OTHER MACHINES
Filed May 3, 1955

INVENTOR
ROGER MULLER
BY

United States Patent Office 2,862,405
Patented Dec. 2, 1958

2,862,405

STROKE VARYING DEVICE FOR MECHANICAL PRESSES AND OTHER MACHINES

Roger Müller, Paris, France, assignor to Etablissements Grimar, Paris, France

Application May 3, 1955, Serial No. 505,780

Claims priority, application France November 4, 1954

4 Claims. (Cl. 74—571)

Presses for cutting or punching or for drawing or stamping metals, as well as other similar machines, are commonly equipped with so-called "stroke-varying" arrangements enabling the working stroke of the tool or die to be varied according to the requirements of the particular work to be done.

Such arrangements usually incorporate a cam whose cylindrical outer face, linked to the head of the connecting rod actuating the tool or die, is eccentric with reference to the bore of the cam which is seated on an eccentric boss of the machine driving shaft in such a manner that by imparting an angular motion to the cam, the eccentricity of its outer face with reference to the geometrical axis of the machine driving shaft is modified, means such as keys or splines, teeth, dogs or the like, being provided by which the rotation of the machine driving shaft can in any such preset angular position, be duly transmitted to the cam.

As the cam and the connecting rod end are located between two bearings of the machine driving shaft and are frequently enclosed in a casing, the cam is difficulty accessible for adjustment of the working stroke, which entails loss of time.

An object of the present invention is to avoid this inconvenience.

With this object in view the invention provides a stroke-varying device of the aforesaid kind, characterised in that the cam is coupled to the machine driving shaft by a sliding type of coupling and is provided with an actuating device including a sleeve concentric with the driving shaft and extending to one end thereof, outside the corresponding shaft bearing, where said sleeve is equipped with appropriate means to enable it to be slid and rotated with reference to the driving shaft.

In one embodiment the cam is provided internally with gear teeth meshing with corresponding external teeth on the machine driving shaft and capable of being placed out of mesh therewith by sliding; the cam being associated with a plate axially movable and working in conjunction with a further plate having a radial groove in which a tooth or dog for driving the aforesaid cam is capable of sliding; such second plate being attached to the above-mentioned sleeve.

The foregoing and other features of the invention will be apparent from the following description and the accompanying drawing which shows by way of example one form of the stroke-varying device as applied to a press.

Figure 1:
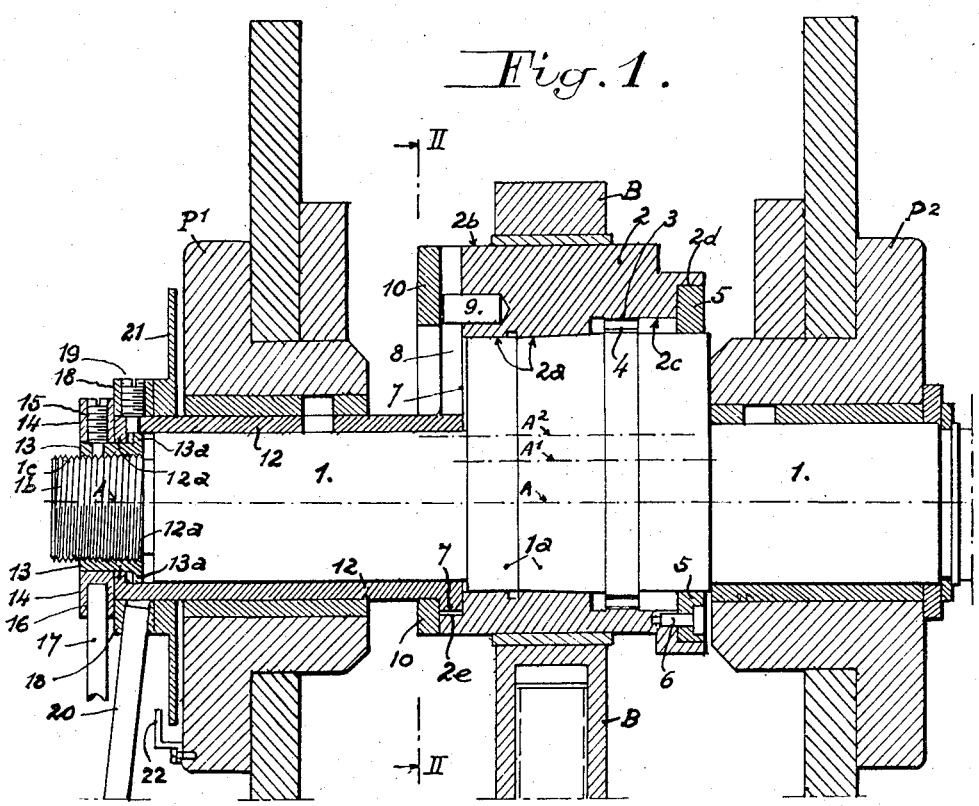
Fig. 1 is a longitudinal sectional elevation.

On the drawing, 1 represents the machine driving shaft rotatable about the axis A in bearings P¹ and P² and having an eccentric cylindro-conical boss 1a the axis of which is represented by A¹. 2 designates the stroke regulating cam, of which the bore 2a encircles the boss 1a on the shaft 1 and the cylindrical outer face 2b, concentric with the axis A², is linked with the connecting rod head B and is eccentric with reference to said bore 2a in such manner that when the cam 2 is rotated on the boss 1a the eccentricity of the connecting rod head B with reference to the shaft 1, and consequently the stroke of the tool or die, are changed. The maximum and minimum amounts of such eccentricity are respectively equal to $e+e^1$ and $e-e^1$; $e$ representing the distance between the axes A and A¹, $e^1$ the distance between the axes A¹ and A², and $e$ being greater than $e^1$. This arrangement enables the stop dead centre of the connecting rod to be maintained opposite to the point of greatest pressure; the first being the top dead centre and the second the bottom dead centre in the case here represented of a vertical press.

In addition to the cylindro-conical bore 2a the cam 2 is provided with a second bore 2c having teeth 3 meshing with other teeth 4 on the shaft 1 and capable of being disengaged from the latter by sliding; as well as third bore 2d containing a centering and abutment ring 5 attached to said cam by screws 6.

Figure 2:
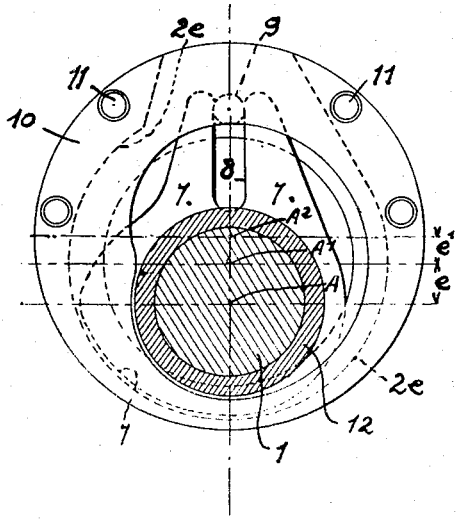
Fig. 2 is a cross-section along the line II—II of Fig. 1.

On the side opposite the teeth 3 the cam 2 has yet a further bore 2e containing a plate 7 of suitable shape having a radial groove 8 in which a pin 9 carried by the cam 2 is slidable. This plate 7 is held in place by a second plate 10 attached to the cam 2 by screws 11 (see Fig. 2) and is integral with a sleeve 12 concentric with the shaft 1 and extending to one end thereof, outside the bearing P¹, at which point it is provided with any suitable means for sliding and rotating it with reference to said shaft.

It will be evident that by sliding the sleeve 12 to the left in Fig. 1, the teeth 3 on the cam can be disengaged from the teeth 4 on the shaft 1, after which, by turning said sleeve 12, the cam 2 can be rotated, by means of the assembly 8—9, to modify the degree of eccentricity and hence the length of stroke of the tool actuated by the connecting rod B.

The sliding motion of the sleeve 12 is obtained in the embodiment shown, by the following means: said sleeve is provided at one end, opposite to a neck 1b of smaller diameter on the shaft 1, with an inwardly extending flange or shoulder 12a, which is held between a collar 13a on a bush 13 screwed on a threaded portion 1c of the shaft 1 and a ring 14 attached to this bush 13 by a screw 15, holes 16 being provided in the circumference of said ring 14 for the insertion of a setting key 17.

The rotation of the sleeve 12 is further controlled by a second ring 18 attached to this sleeve by a screw 19 and provided with holes for the insertion of a further setting key 20. The ring 18 carries a scale 21 graduated for the different lengths of stroke required in the machine, which scale rotates past a fixed reference mark or pointer 22 enabling the required values to be selected.

In order to change the length of stroke of the tool it is first necessary to turn the ring 14 by means of the key 17 in the direction for unscrewing the bush 13. This latter, through the intermediary of its collar 13a rotating on the shoulder 12a, slides the sleeve 12 towards the left in Fig. 1 and consequently, also the cam 2. When, in the course of this motion the flange 5 strikes against the teeth 4 on the shaft 1, the teeth 3 of the cam are disengaged from the aforesaid shaft teeth 4. The ring 18 is now turned by the setting key 20 in the direction necessary to bring the particular division of the scale 21 corresponding to the length of stroke required, opposite the reference mark or index 22; this rotation of the ring 18 causing a corresponding rotation of the sleeve 12 and the cam 2. After this, it is sufficient to return the teeth 3 of the cam 2 into mesh with the teeth 4 of the shaft 1 by sliding the assembly 12—10—2 in the opposite direction which is effected by screwing in the bush 13. The machine is now again ready to work.

In case of need, particularly when the foot end of the connecting rod B is ball-jointed to the tool-carrying slide, stops may be provided on either side of the connecting rod head B to hold it in place during sliding of the cam 2.

From the preceeding description it will be evident that all operations for changing the length of stroke are performed from the outside and with great ease, without having to touch either the cam or the connecting rod, which can consequently be inaccessible.

The invention is equally applicable to various kinds of presses, and to any machines requiring a variable stroke in general. It is not restricted to the embodiment described, but embraces likewise all possible variants, as for instance that in which the sliding and rotation of the sleeve 12 are effected by means other than those described, or that in which the teeth 3 and the teeth 4 are dispensed with and said sleeve is provided on the side of the cam 2 with a plate having radially-extending projections normally engaging in corresponding radial slots in the end face of the cam and the end face of the eccentric boss on the shaft 1 concentrically with the axis of the latter, the slots on the cam being deeper than those on the said boss, in such manner that when the said sleeve is slid through a limited distance, it can be disconnected from the shaft 1 without becoming disconnected from the cam, after which the length of stroke can be adjusted by rotating the sleeve, directly causing a corresponding rotation of the cam, and the return into the initial position of engagement of the sleeve with the cam 2 and the shaft 1 being obtained by again sliding the sleeve in the opposite direction.

I claim:

1. A stroke varying device for mechanical presses and like machines, comprising a machine driving shaft, an eccentric boss on said driving shaft, a cam having a bore rotatably fitting said eccentric boss and an outer cylindrical surface eccentric with respect to said bore, a tool-actuating connecting rod engaging said outer cylindrical surface of the cam, a sliding coupling connecting said cam to said driving shaft for common rotation with said driving shaft, said sliding coupling being disengageable by longitudinal displacement of said cam with respect to said driving shaft, and a device for displacing said cam longitudinally and rotatively on said eccentric boss, said device for displacing said cam including a sleeve concentric with said driving shaft and extending to one end of said driving shaft, radially slidable coupling means coupling said cam for common rotation and common longitudinal displacement with said sleeve, and means engaging the end of said sleeve adjacent to said end of the driving shaft for imparting to said sleeve longitudinal and rotary displacements with respect to said driving shaft.

2. A stroke varying for mechanical presses and like machines, comprising two bearings, a machine driving shaft rotatably mounted in said bearings, an eccentric boss on said driving shaft between said bearings, a cam having a bore rotatably fitting said eccentric boss and an outer cylindrical surface eccentric with respect to said bore, a tool-actuating connecting rod engaging said outer cylindrical surface of the cam, a sliding coupling connecting said cam to said driving shaft for common rotation with said driving shaft, said sliding coupling being disengageable by longitudinal displacement of said cam with respect to said driving shaft, and a device for displacing said cam longitudinally and rotatively on said eccentric boss, said device for displacing said cam including a sleeve concentric with said driving shaft, said sleeve having an inner end adjacent to said cam and an outer end adjacent to one end of said driving shaft and outside one of said bearings, radially slidable coupling means coupling said cam for common rotation and common longitudinal displacement with said inner end of the sleeve, and means engaging said outer end of said sleeve for imparting to said sleeve longitudinal and rotary displacements with respect to said driving shaft.

3. A stroke varying device for mechanical presses and like machines, comprising two bearings, a machine driving shaft rotatably mounted in said bearings, an eccentric boss on said driving shaft between said bearings, a cam having a bore rotatably fitting said eccentric boss and an outer cylindrical surface eccentric with respect to said bore, a tool-actuating connecting rod engaging said outer cylindrical surface of the cam, a sliding coupling connecting said cam to said driving shaft for common rotation with said driving shaft, said sliding coupling being disengageable by longitudinal displacement of said cam with respect to said driving shaft, and a device for displacing said cam longitudinally and rotatively on said eccentric boss, said device for displacing said cam comprising a sleeve concentric with said driving shaft, said sleeve having an inner end adjacent to said cam and an outer end adjacent to one end of said driving shaft, outside one of said bearings, a first plate connected to said cam and axially spaced therefrom, a second plate mounted on said inner end of said sleeve and engaged between said cam and said first plate, said second plate being formed with a radial groove, a driving pin on said cam, said driving pin being engaged in said groove, means engaging said outer end of said sleeve for imparting to said sleeve longitudinal displacements with respect to said driving shaft, and means engaging said outer end of said sleeve for imparting to said sleeve rotary displacements with respect to said driving shaft.

4. A stroke varying device for mechanical presses and like machines, comprising two bearings, a machine driving shaft rotatably mounted in said bearings, an eccentric boss on said driving shaft between said bearings, a cam having a bore rotatably fitting said eccentric boss and an outer cylindrical surface eccentric with respect to said bore, a tool-actuating connecting rod engaging said outer cylindrical surface of the cam, a sliding coupling connecting said cam to said driving shaft for common rotation with said driving shaft, said sliding coupling being disengageable by longitudinal displacement of said cam with respect to said driving shaft, and a device for displacing said cam longitudinally and rotatively on said eccentric boss, said device for displacing said cam comprising a sleeve concentric with said driving shaft, said sleeve having an inner end adjacent to said cam and an outer end adjacent to one end of said driving shaft, outside one of said bearings, a first plate connected to said cam and axially spaced therefrom, a second plate mounted on said inner end of said sleeve and engaged between said cam and said first plate, said second plate being formed with a radial groove, a driving pin on said cam, said driving pin being engaged in said groove, means engaging said outer end of said sleeve for imparting to said sleeve longitudinal displacements with respect to said driving shaft, said means comprising a shoulder on said outer end of said sleeve, a movable bush screwed on said driving shaft, a collar on said bush and a ring attached to said bush, said shoulder being engaged between said collar and said ring, and other means engaging said outer end of said sleeve for imparting to said sleeve rotary displacements with respect to said driving shaft, said other means comprising a rotatable ring attached to said outer end of said sleeve, a scale marked on said ring and a fixed index mark adjacent to said scale.

References Cited in the file of this patent

UNITED STATES PATENTS

| | | |
|---|---|---|
| 306,972 | Stiles | Oct. 21, 1884 |
| 540,843 | Richards | June 11, 1895 |
| 1,091,496 | Fox | Mar. 31, 1914 |
| 1,631,466 | Buffardi | June 7, 1927 |
| 2,006,779 | Terrell | July 2, 1935 |
| 2,569,900 | Nevin, Sr., et al. | Oct. 2, 1951 |

FOREIGN PATENTS

| | | |
|---|---|---|
| 660,724 | Great Britain | Nov. 14, 1951 |